Feb. 10, 1925.

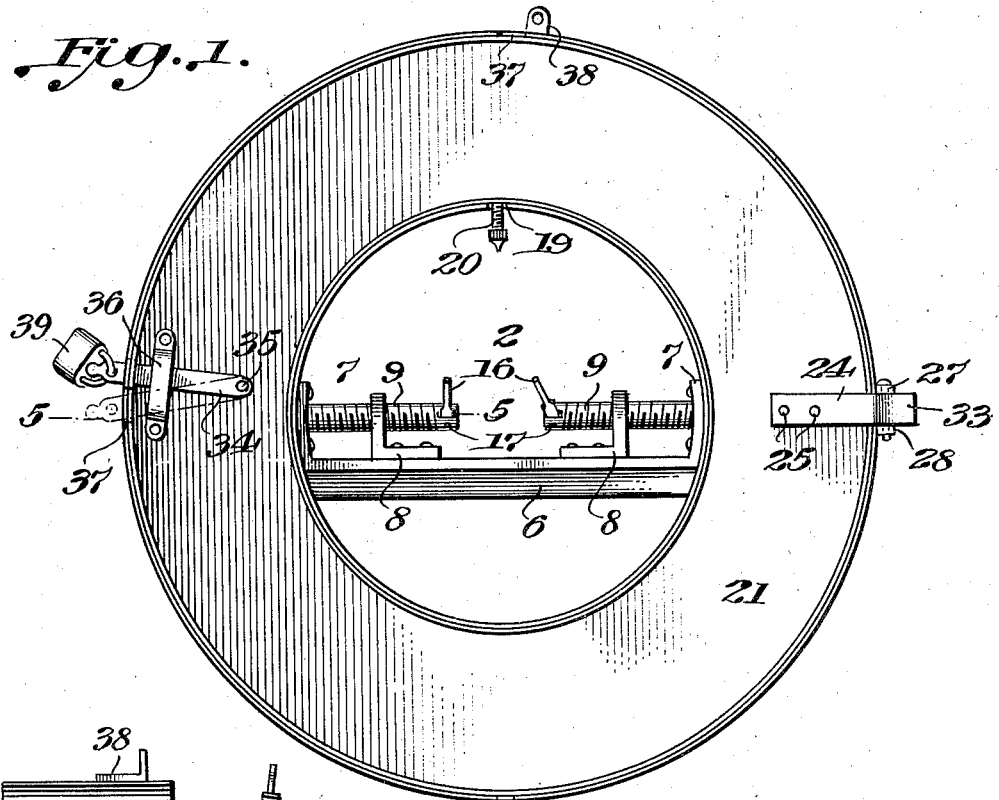

F. WOLF 1,525,710

AUTOMOBILE TIRE CARRIER

Filed Oct. 5, 1923

Inventor:
Frank Wolf
By ........ Atty.

Patented Feb. 10, 1925.

1,525,710

UNITED STATES PATENT OFFICE.

FRANK WOLF, OF RAPID RIVER, MICHIGAN.

AUTOMOBILE TIRE CARRIER.

Application filed October 5, 1923. Serial No. 666,687.

*To all whom it may concern:*

Be it known that I, FRANK WOLF, a citizen of the United States, residing at Rapid River, in the county of Delta and State of Michigan, have invented a new and useful Improvement in Automobile Tire Carriers, of which the following is a specification.

This invention relates to automobile tire carriers of that general class comprising a shell adapted to enclose the tire, means for mounting the tire within the shell, and a closure for the shell.

My object is the production of an improved tire carrier of this class, which will be adapted for use either at the rear of the automobile or on the running board or front fender thereof, wherein the door or closure may be arranged to open and close without interference to afford access to the interior of the carrier so that the tire may be removed or replaced.

Automobiles of different makes and types vary greatly in their construction and equipment at the rear and side. With my tire carrier, having an improved door or closure such as hereinafter set forth, it is possible to mount the device either at the rear or the side of the car and to arrange the door or closure so that it will open and close without obstruction.

The foregoing object is accomplished by the provision of a door or closure which is adapted to be hinged either at the side or at the bottom of the shell, said door and its hinging and locking means being so arranged that the point of hinging may be at the side or bottom of the shell and the change may be made quickly and easily, inasmuch as detachable hinging and locking devices are provided.

A further object is the provision of an improved tire carrier, adapted to completely enclose the tire or tires for protection against the elements and to prevent theft, wherein novel means will be provided for mounting and holding the tire or tires, and for operating the tire holding means or clamps; for hinging and locking the cover or closure, and for other purposes appearing more fully hereinafter.

Tire mounting means or clamps are provided which prevent chafing of the tire or tires; the operating means for the clamps are so constructed that they may be readily manipulated despite the limited space available, thus overcoming a defect incident to tire carriers of this general class; the hinges and locks are of such improved construction that they cannot be easily tampered with; the shell adapted for housing the tire or tires is of special construction to effectuate its purposes.

In the accompanying drawings:

Figure 1 is a front elevation, the cover being hinged at the side of the carrier and closed.

Fig. 2 is a side elevation, partly in section, the cover being shown as hinged at the side of the shell and partly opened.

Fig. 3 is a side elevation, the cover being hinged at the bottom of the shell and in partly opened condition.

Figs. 7 and 8 are details of the hinge connections.

Figure 4:
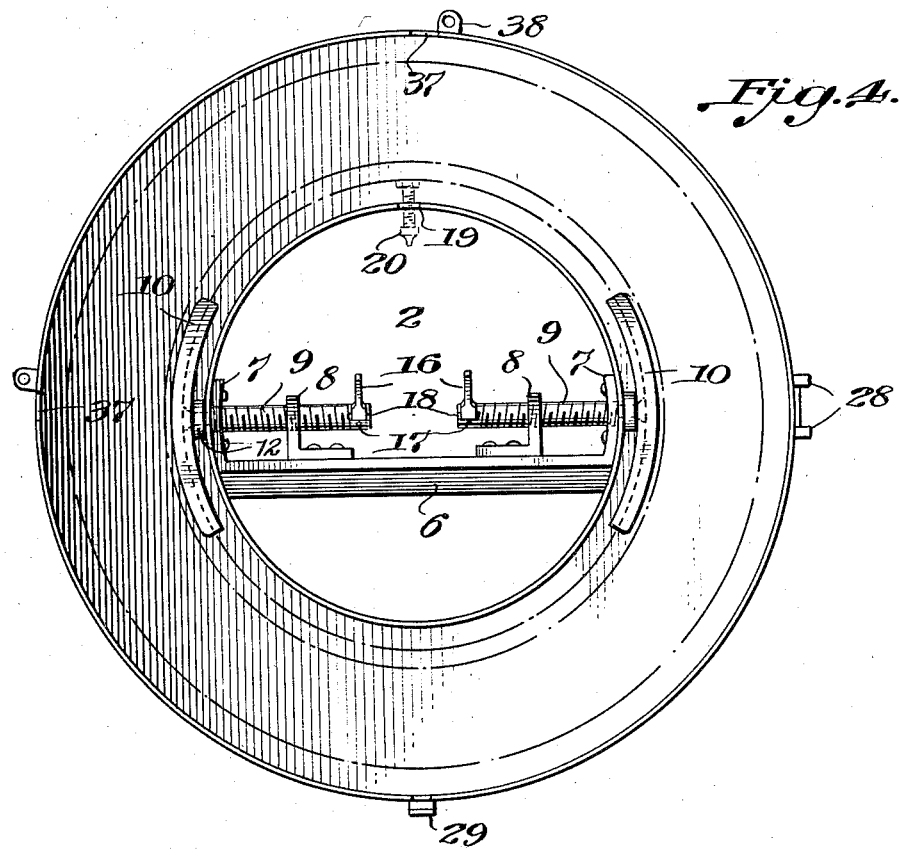
Fig. 4 is a front elevation, the cover being removed.
Figure 5:
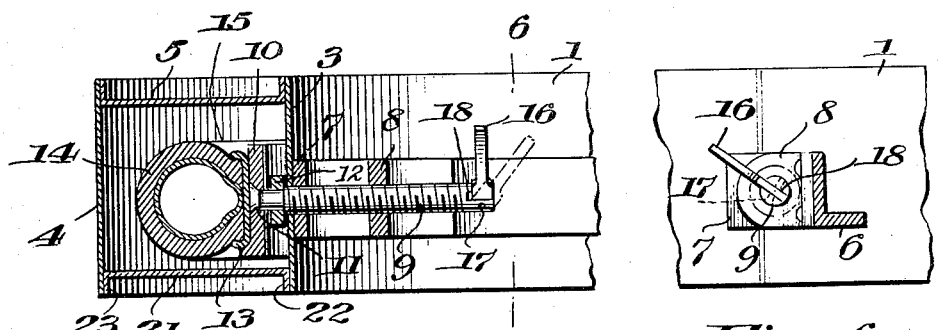
Fig. 5 is a detail section on the line 5—5, Fig. 1, a tire being shown to illustrate the manner of mounting it.
Figure 6:
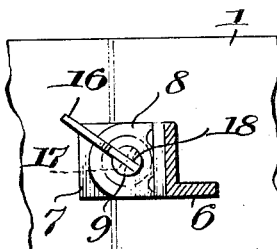
Fig. 6 is a detail section on the line 6—6, Fig. 5.

The shell 1 is of annular form having an open center 2 and being composed of inner and outer concentric metal bands 3, 4, and a flanged back 5 suitably secured thereto in any desired manner.

Extending across the space 2 is a casting or a strap metal piece 6 which has feet 7 suitably secured, as by riveting, to the inner band or wall 3.

Any suitable bracket or brackets, not shown, may be connected to the piece 6 to support the tire carrier at the rear or the side of the automobile, the construction permitting the tire carrier to be so disposed on the car as will be most convenient and satisfactory according to the tire and make of automobile and, as will presently appear, the door and the fittings are so constructed and arranged that the door may open at the bottom or at the side of the shell 1, according to requirements of the installation.

The casting or piece 6 is provided with bearings or brackets 8. Engaged with screw threaded holes in the bearings or brackets 8 and the feet 7 are screws 9 which carry tire clamps 10 that are swiveled thereto at 11, suitable collars 12 being provided. The clamps 10 have an annular ridge or flange 13 of just sufficient height to prevent the tire 14 and its rim 15 from sliding off but said ridge or flange does not interfere with the removal of the tire and its rim when the clamps are properly retracted. By screwing the clamps 10 in opposite directions, after the tire has been mounted on said clamps, the tire and its rim are securely held.

To enable the screws 9 to be turned to operate the clamps, despite the limited space provided for the operating means for the screws, the levers or handles 16 are provided which are pivoted on pins 17 in slots 18, the arrangement being such that the levers or handles may be moved a half revolution and then swung to an opposite position on the pivots 17 so that they may be again turned through a part revolution. The inner band 3 is provided with a slot 19 in which the valve 20 of the tire 14 may be accommodated.

The shell is provided with a ring-shaped or annular cover or door 21 which is flat except that it is provided with annular flanges 22, 23, which strengthen it and, being adapted to fit against the bands 3 and 4, reinforces the shell and also forms a tight, anti-rattling joint which excludes rain and snow.

The door 21 is adapted to be entirely disconnected from the shell 1 so that it may be hinged either to the side or the bottom of said shell, according to the requirements of the installation which, in turn, is dependent upon the type and make of automobile and whether the tire carrier is mounted at the rear or on the running board of the car.

To carry out its purpose, the door 21 is provided with a detachable hinge member 24 shown in detail in Fig. 7, said member being riveted or otherwise fastened at 25 to the door and provided with an eye 26 for the pintle 27, the latter being a bolt or pin which may be removed.

The hinge member 28 is secured to the side of the shell 1, said member being provided with eyes adapted to aline with the eye or opening 26 so that the pintle 27 may be inserted through them for the purpose of hinging the door to swing horizontally as shown in Figs. 1 and 2. This arrangement will usually be found preferable when the tire carrier is located at the rear of the automobile but on some cars it may be preferable to hinge the door at the bottom of the shell 1 even when the tire carrier is at the rear of the automobile. Similarly, on some cars where it is necessary to install the tire carrier on the running board, it may be found preferable to have the door swing horizontally, whereas with other cars it is preferable to hinge the door at the bottom, as shown in Fig. 3.

Therefore, to meet all requirements, my invention contemplates the provision of a door which may be hinged either at the side or the bottom of the shell 1, the user having the door hinged at one or the other of these points, according to requirements.

To enable the door to be hinged at the bottom of the shell 1, there is provided a hinge member 29 such as shown in detail in Fig. 8. This member has holes through which rivets or fastenings 30 secure it to the bottom of the shell 1 and it is provided with a projecting, downwardly offset part 31 which has a slot 32, said slot being of a size adapting it to loosely receive the projecting part 33 of the hinge member 24 as best shown in Fig. 3.

The door is locked at a point opposite from its point of hinging, by a latch 34 which is pivoted at 35 to the door and swings in a metal strap or guide 36. The free end of the latch projects beyond the periphery of the door or cover and is arranged for reception in a slot 37 in the band 4. Secured to the band 4 is a bracket 38. The bracket 38 and the end of the latch 34 have holes which are adapted to register so that the hasp of a padlock 39 may be passed through them for the purpose of locking the door.

At the top of the shell 1 there is also provided a bracket 38 and a slot 37 so that when the door is hinged at the bottom of the shell the latch 34 may be locked at the top of the shell.

I claim:

1. In a tire carrier, the combination with a shell or casing adapted to contain a tire, and means for mounting the tire therein, of a door or cover for said shell or casing, and means for hinging said door or cover to the shell or casing at different points thereof, said hinging means adapting the door to be swung either in a general horizontal direction or in a general vertical direction, according to which hinge connection is used.

2. In a tire carrier, the combination with a shell or casing adapted to contain a tire, and means for mounting the tire therein, of a door or cover for said shell or casing, and detachable hinge connections for the door or cover, located at different points of the shell or casing, said hinge connections adapting the door to be swung either in a general horizontal direction or in a general vertical direction, according to which hinge connection is used.

3. In a tire carrier, the combination with a shell or casing adapted to contain a tire, and means for mounting the tire therein, of a door or cover for said shell or casing, means for hinging said door or cover to the shell or casing at different points thereof, said hinge connections adapting the door to be swung either in a general horizontal direction or in a general vertical direction, according to which hinge connection is used and locking means arranged for fastening the door or cover to different points of the shell or casing.

4. In a tire carrier, the combination with a shell or casing adapted to contain a tire, and means for mounting the tire therein, of a door or cover for said shell or casing, detachable hinge connections for the door or cover, located at different points of the shell or casing, said hinge connections adapting the door to be swung either in a general horizontal direction or in a general vertical direction, according to which hinge connection is used, and locking means carried by the shell or casing and the door or cover, respectively, whereby the point of locking may be changed when the point of hinging of the door is changed.

5. In a tire carrier, the combination with a shell or casing adapted to contain a tire and means for mounting the tire therein, of hinge connections located at different points of the shell or casing, locking connections located at different points of the shell or casing, a bodily removable door for the shell or casing, a hinge member carried by the door and adapted to be hingedly attached to either of the hinge connections aforesaid, said hinge connections adapting the door to be swung either in a general horizontal direction or in a general vertical direction, according to which hinge connection is used and locking means carried by the door adapted to fasten to either of the locking connections aforesaid, according to which hinge connection is engaged by the hinge member.

6. In a tire carrier, the combination with an annular, three-walled shell or casing adapted to contain a tire, and a door or cover for said shell or casing, of a member bridging the open central part of the shell or casing and attached to said shell or casing, screws mounted to turn in said member, and tire clamps carried by said screws and located inside of the shell or casing.

7. In a tire carrier, the combination with an annular, three-walled shell or casing adapted to contain a tire, and a door or cover for said shell or casing, of a member bridging the open central part of the shell or casing and attached to said shell or casing, screws mounted to turn in said member, tire clamps carried by said screws and located inside of the shell or casing, and pivoted handles or levers carried by the screws and arranged to swing in the direction of the lengths of the screws, whereby after said screws have turned a part revolution by operating said handles or levers, said levers may be reversed or swung on their pivots for a continuance of the rotation of the screws.

In testimony whereof I hereunto affix my signature.

Rapid River, Michigan, May 26th, 1924.

FRANK WOLF.